INVENTOR
NEAL R. PARLATORE
BY
ATTORNEY

Nov. 10, 1964 N. R. PARLATORE 3,156,343
CIGAR FEEDING DEVICE
Filed March 19, 1962 4 Sheets-Sheet 3

INVENTOR
NEAL R. PARLATORE
BY
ATTORNEY

Nov. 10, 1964   N. R. PARLATORE   3,156,343
CIGAR FEEDING DEVICE
Filed March 19, 1962   4 Sheets-Sheet 4

INVENTOR
NEAL R. PARLATORE
BY
ATTORNEY

United States Patent Office 3,156,343
Patented Nov. 10, 1964

3,156,343
CIGAR FEEDING DEVICE
Neal R. Parlatore, Laurelton, Queens, N.Y., assignor to American Machine & Foundry Company, a corporation of New Jersey
Filed Mar. 19, 1962, Ser. No. 180,792
5 Claims. (Cl. 198—34)

The present application relates to apparatus for feeding materials and, in particular, to apparatus for serially feeding elongated objects such as cigars or the like.

In the co-pending application, S.N. 54,259 "Cigar Wrapping Machine and Bander," Craig et al., filed September 6, 1960, now U.S. Patent No. 3,090,176, there is described an automatic machine for the cellophane wrapping and banding of cigars in a continuous manner. For the continuous operation of the machine described in the above application, it is necessary to feed a row of cigars individually and serially to the apparatus. The present invention has as its object the provision of such a feeding mechanism.

Amongst the objects of the present invention is the provision of an apparatus for receiving a plurality of cigars from a hopper or other accumulating storage device separating the same into individual units and conveying the cigars individually and serially to the machine. Other and more detailed objects of the invention will be apparent from the foregoing description taken together with the accompanying drawings in which.

In the cigar feeding and separating device illustrated in the accompanying drawings the cigars C to be fed to a wrapping machine turret are placed either by hand or a suitable conveyor in form of a row onto a feed plate 10 where said row is advanced until the leading cigar contacts a stop block 12 which is secured to the top face of the center portion of feed plate 10. The latter is horizontally supported and fastened to suitable transverse cross members 14 which in turn are mounted on the top edges of a pair of spaced frame members 16 which constitutes the main supporting frame of the device.

Figure 1:
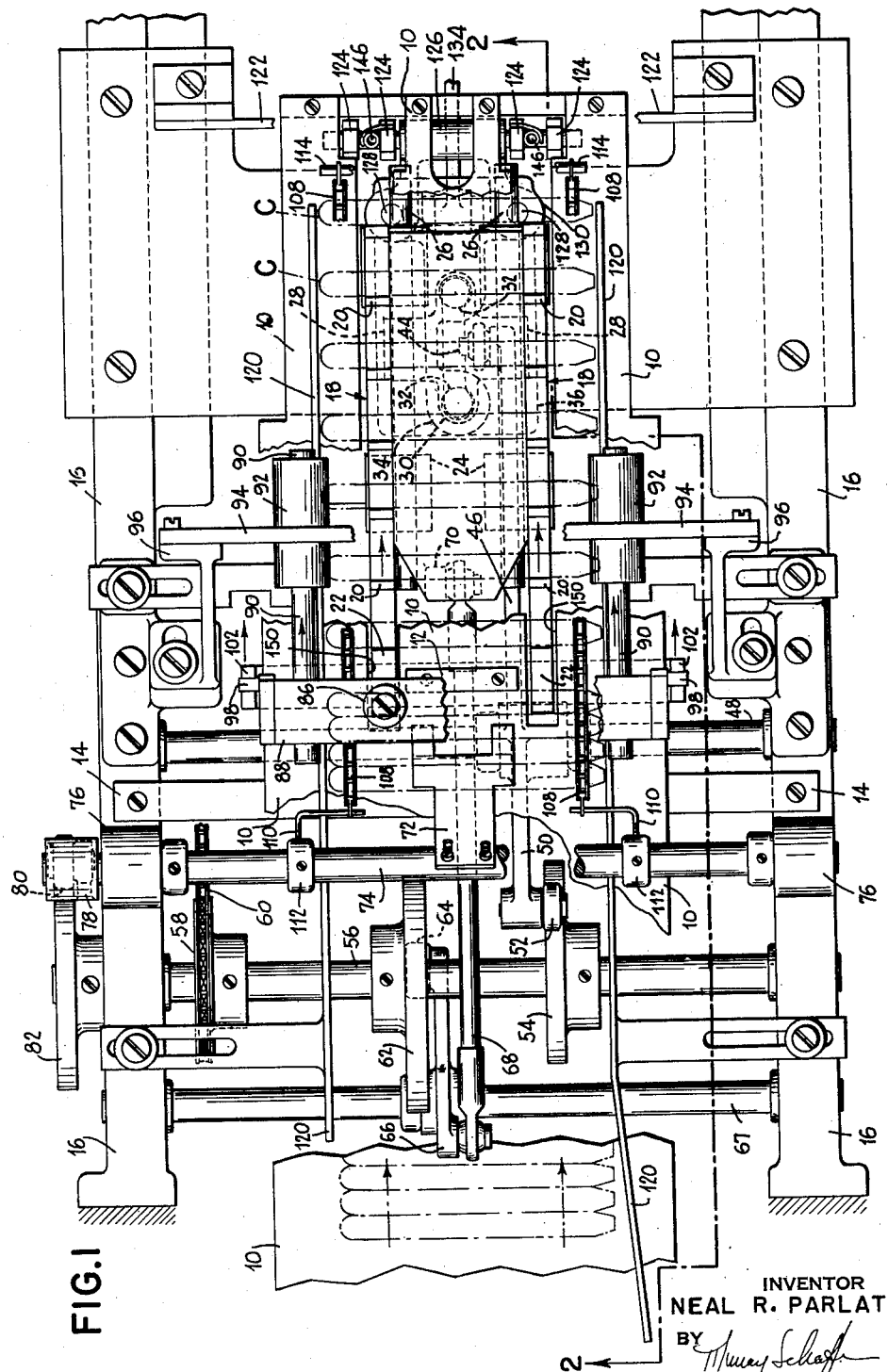
FIG. 1 is a plan view of the cigar feeding and separating device.
Figure 2:
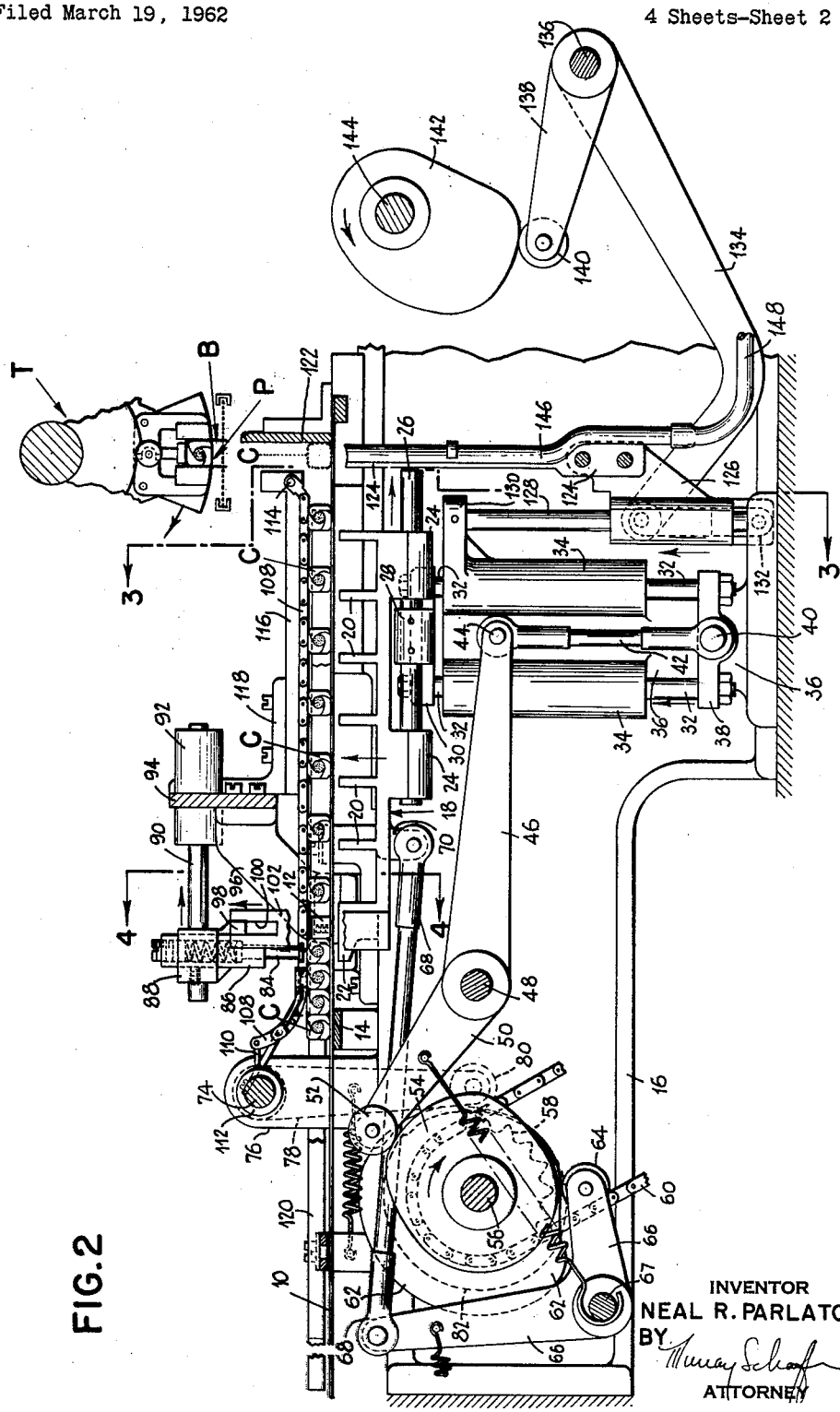
FIG. 2 is a sectional side elevation of the same, taken on line 2—2 of FIG. 1.
Figure 3:
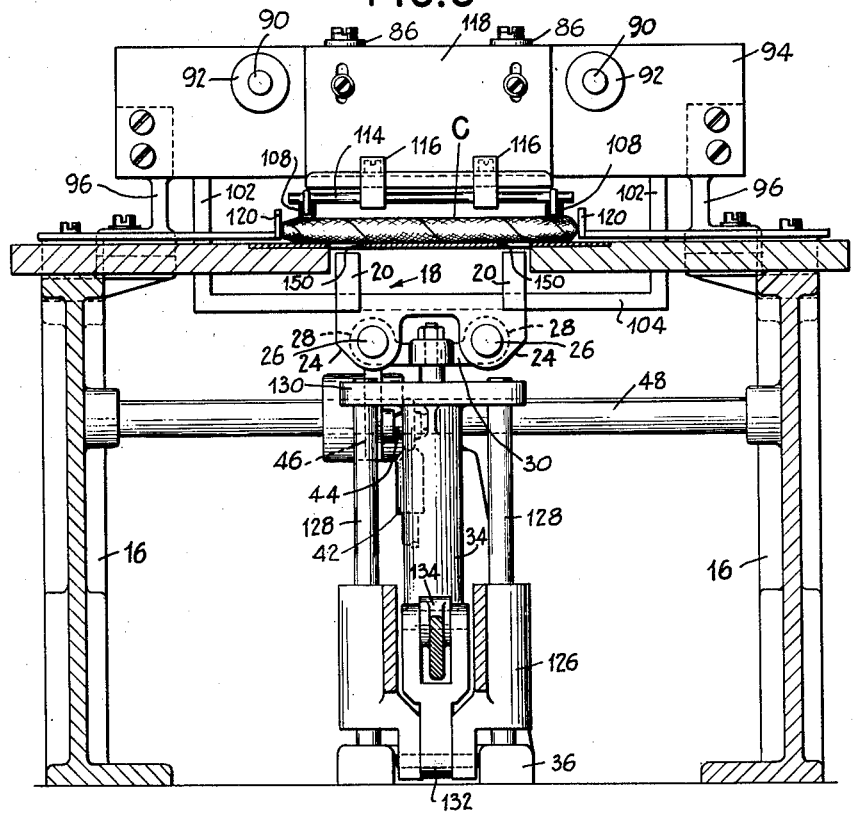
FIG. 3 is a sectional and elevational view of the device, taken on line 3—3 of FIG. 2.
Figure 4:
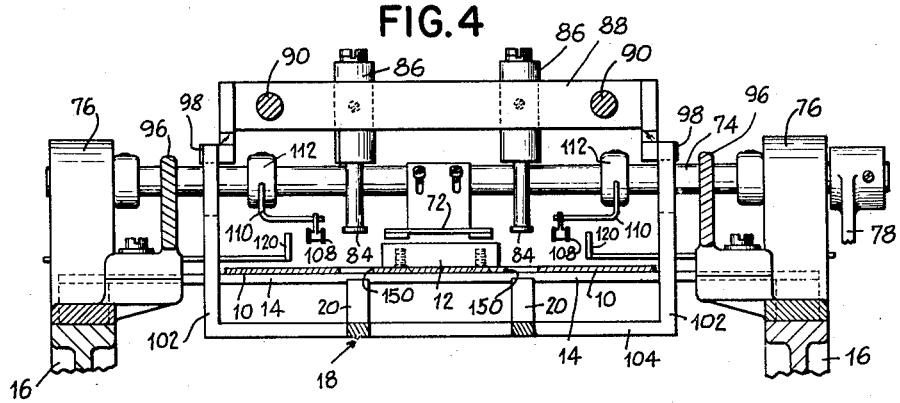
FIG. 4 is another sectional and elevational view, taken on line 4—4 of FIG. 2.

Since the main objects of this invention is to separate each cigar from the following row and then forward or advance the separated cigars in properly spaced relation to each other so that they may be fed one by one into a wrapping machine turret, the device is provided with a walking beam rake 18. The walking beam 18 in turn is provided with two rows of upwardly projecting spaced prongs 20 with the first or leading prong in each row formed into a cigar elevating lug 22. Projecting from the bottom side of the walking beam rake 18 are two pairs of spaced supporting lugs 24, each pair of which slidingly engages with a horizontal shaft 26, both of which are held by and secured to suitable lugs 28 of a horizontal platform 30. Platform 30 in turn is mounted to the free upper ends of a pair of spaced vertical shafts 32. Vertical shafts 32 are slidably supported by means of a pair of vertical bearing lugs 34 which are an integral part of a frame bracket 36. The lower free ends of the vertical shafts 32 are secured to a suitably shaped tie lug 38 which in its center portion carries a stud 40 to which is pivotally secured to one end of a connecting rod 42 while the other end of the latter is pivoted to a stud 44 projecting from and carried by an actuating arm 46 pivotally mounted on a horizontal shaft 48. Shaft 48 is rotatably supported in suitable bearings of the frame numbers 16. From the hub of actuating arm 46 projects a cam lever 50 to the free end of which is pivoted a cam roller 52 which engages with a cam 54 which is designed to impart through the aforementioned connections vertical up and down movement to the walking beam 18. Cam 54 is mounted on a horizontal cam shaft 56 rotatably supported in suitable bearings of the frame numbers 16. To cam shaft 56 is secured a drive sprocket 58 which through a chain 60 is connected to the main drive of the machine (not shown). To cam shaft 56 is secured another cam 62 which is engaged by a cam roller 64 pivoted to the free end of one arm of a bell crank shaped lever 66 which to the free end of the other cam of said bell crank lever is pivotally attached one end of a connecting rod 68. The other end of connecting rod 68 is pivotally secured to a lug 70 projecting from the bottom of the walking beam 18 (FIG. 2). Bell crank lever 66 is rotatably mounted on a transverse shaft 67 supported by the frame members 16. Since, as mentioned earlier, the walking beam 18 is slidably supported by the horizontal shafts 26, the rotation of cam 62 through the aforementioned connections will affect a horizontal reciprocating motion of said walking beam 18.

Figure 5:
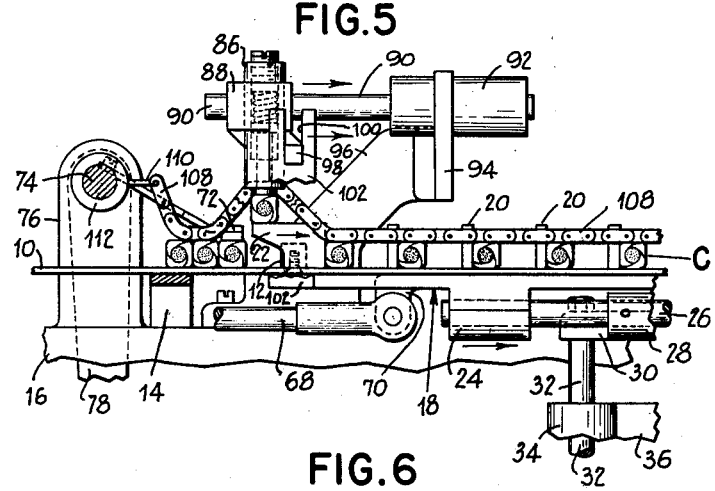
FIGS. 5, 6 and 7 are partial side elevations of the machine illustrating the successive steps of the cigar feeding and separating mechanisms during feeding and separating action.

In order to separate the cigars one by one from the column or row of cigars arrested in front the stop block 12 and feed them in proper spaced relation to the wrapping machine turret, the walking beam 18, when in its forewardmost position below the feed table 10 as shown in FIG. 2, rises and with its two spaced elevating lugs 22 engages the bottom portion of the leading cigar adjacent to the stop block 12 and lifts said cigar straight up and out of contact with the stop block 12 as well as the column of the cigars from which it was lifted as illustrated in FIG. 5. In order to prevent undue pressure of the column against the leading cigar to be lifted and also to assure that the cigar next to the leading one is not turned or dislodged when the leading cigar is elevated, a fork-shaped hold-down finger 72 is lowered and pressed onto the cigar next to the leading one shortly before the latter is elevated. The hold-down finger 72 is adjustably secured to a horizontal shaft 74, rotatably supported by a suitable pair of bearings lugs 76 projecting upward from the frame members 16. Shaft 74 is oscillated in proper time relation by means of a cam lever 78 mounted thereon. Cam lever 78 carries a cam roller 80 which engages with a cam 82 mounted on the main cam shaft 56.

In order to prevent the leading cigar from shifting or misaligning while being elevated by the lugs 22 of the walking beam 18, the leading cigar shortly after the start of its lifting is engaged by a pair of vertical spring mounted plungers 84 which hold the cigar firmly against the elevating lugs 22 of the walking beam 18, and due to their spring mounting go up with the cigar as the latter is elevated. The spring mounted vertical plungers 84 are slidably supported by a pair of vertical housings 86 which are adjustably secured to a horizontal crossbar 88 which in turn is slidably supported by a pair of spaced horizontal rods 90 fixedly held by a pair of lugs 92 which are an integral part of a cross member 94. Member 94 at each end is secured to a suitable supporting bracket 96, both of which are mounted on the frame members 16. To each end of the horizontal cross-bar 88 which carries the spring plungers 84 is secured a suitably shaped shoe 98, each of which engages with a vertical slot 100 in each of the two upright legs 102 of a U-shaped member 104 which is secured to or integral with the front portion of the walking beam 18.

Since it is the object of this invention to separate the cigars one by one from a column and then feed them in spaced relation and intermittently to a wrapping machine turret, the cigar after being lifted as described above is then conveyed over the stop block 12 and then lowered again and deposited on the feed plate 10 on the other side of the stop block 12. The conveying of the elevated cigar over the stop block 12 is, of course, accomplished due to the action of the cam 68 which controls the horiozntal or back and forth motion of the walking beam 18, and the lowering of the cigar after being conveyed over said stop block is effected by the cam 54 which controls the vertical, meaning the up and down motion of said walking beam. The spring plungers 84 which contacted the top side of the cigar and held the latter firmly to the elevating lugs 22 of the walking beam while being elevated, stay in engagement due to the fact that the plunger supporting bar 88 is slidably supported by the rods 90 and said bar must follow the horizontal movement of the walking beam due to the engagement of its shoes 98 in the slots 100 of member 104 which is secured to the walking beam 18.

Figure 6:
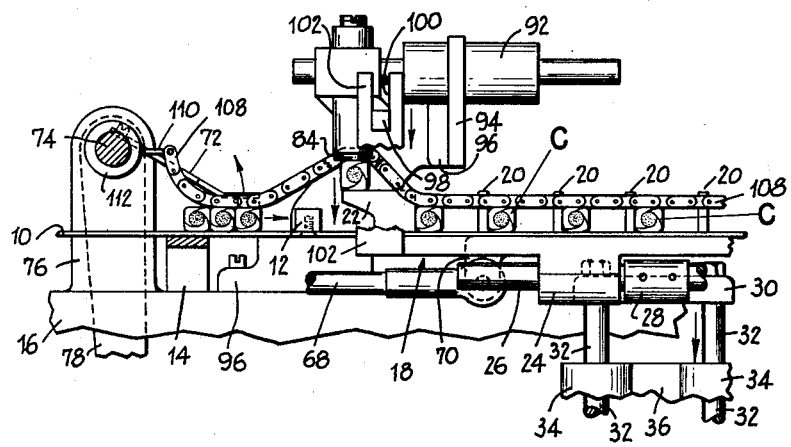
Figure 7:
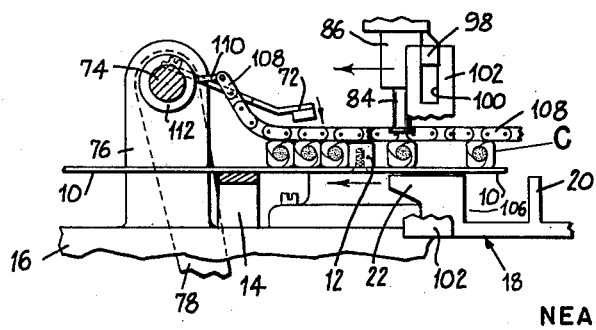

After the cigar is conveyed over the stop block 12 and lowered again and deposited onto the feed plate 10 the walking beam 18, of course, keeps going down (FIGS. 6 and 7) until its upwardly projecting prongs 20, as well as its elevating lugs 22, are well below the feed plate 10 after which said walking beam is moved horizontally backward below feed plate 10 to its starting position and ready to repeat its cycle. During this backward horizontal movement of the walking beam 18 the spring plungers 84, of course, move backward with the same due to the connection of the walking beam 18 and the plunger supporting mechanism described heretofore. The machine is timed in such a manner that, as soon as the walking beam reaches its lowermost position, the hold down finger 72, due to the action of cam 82, moves upward and thus permits the column of the cigars to advance until the leading cigar again is arrested by the stop block 12 as illustrated in FIG. 7. At the next cycle of the machine the cigar previously lifted over the stop block 12 engages with the vertical rear sides 106 (FIG. 7) of the elevating lugs 22 of the walking beam when the latter advances to convey the next cigar over the stop block 12 as shown in FIG. 6. The other previously lifted cigars, of course, engage at the same time with the upright prongs of the walking beam 18 and are advanced along the feed table 10 at each forward movement of the walking beam during each cycle. Thus the cigars are separated one by one from a column and advanced in spaced relation towards the wrapping machine turret by means of the vertical and horizontal motions of the walking beam 18.

In order to prevent the cigars from rolling over or becoming misaligned while being advanced by the walking beam along the feed plate 10, a light drag action is provided by means of a pair of parallel spaced light chains 108 loosely resting on the top side of each cigar. The front end of each chain 108 is attached to a pin 110 each of which is held by a collar 112 mounted on the transverse shaft 74. The rear ends of said chains are anchored to a horizontal rod 114 held by a pair of supporting bars 116 mounted to the bottom side of an angular bracket 118 adjustably secured to the cross member 94. The ends of the cigars are aligned by means of a pair of spaced guide rails 120 adjustably mounted on the top sides of frame members 16. As each of the spaced cigars reaches the end of the walking beam it is pushed by the last pair of prongs 20 of the latter against a vertical stop plate 122 which is in alignment and directly below a pocket P of an intermittently rotating wrapping machine turret T, such as shown and described in the aforementioned patent. When each cigar reaches this position it is engaged in proper time relation by means of two pairs of vertically reciprocating lifter fingers 124 which lift the cigars from the feed table 10 and push the same together with a wrapper blank B into the waiting pocket of the wrapper turret T.

The vertical lifter fingers 124 are mounted on a double barrel bracket 126 slidably engaging with a pair of spaced vertical rods 128 secured at their bottom end to frame bracket 36 while the top ends of both rods are held by a suitable flange 130 extending from the top portion of one of the bearing lugs 34 (FIG. 2). To the bottom portion of the double barrel bracket 126 is pivotally connected the lower portion of a yoke 132, while the upper portion of the same is pivoted to the free end of an actuating arm 134 mounted on a shaft 136 (FIG. 2) rotatably held by suitable bearings of the main frame of the machine (not shown). Shaft 136 is oscillated by means of a cam lever 138 mounted thereon and carrying a cam roller 140 engaging with a cam 142 on a cam shaft 144 suitably driven in timed relation with cam shaft 56 as well as the drive for the wrapping machine turret (not shown).

In order to prevent the cigars from falling off the lifter fingers 124 during the vertical transfer from the feed table 10 to the pocket P, each pair of said fingers straddles a suction tube 146, the bottom end of each of which is connected by means of a flexible hose 148 to a suitable source of suction (not shown). The top end of each suction tube 146, of course, is even with the top ends of the lifter fingers 124 so that the suction may be applied to the bottom side of the cigar and thus assuring a trouble-free cigar transfer action.

The feed plate 10, of course, is provided with a suitable pair of slots or openings 150 to permit the walking beam 18 to ascend and descend through said feed plates.

It will be apparent that various modifications, within the contemplation of one skilled in the art, may be made without departing from the inventive concept herein provided. Accordingly, the invention is not to be limited to the specific details herein described except insofar as set forth in the appended claims.

I claim:

1. Apparatus for sequentially feeding cigars to the intake station of a continuously operable wrapping machine of the type described comprising, a supporting structure, means for receiving and continuously conveying a plurality of cigars along said supporting structure, means for providing an abutment to obstruct the continuous movement of said cigars and to cause said cigars to accumulate in a row at a forward position along said supporting structure, a first member perpendicular to said supporting structure moveable from beneath to engage the underside of the leading cigar, a second member perpendicular to said supporting structure movable from above to engage the upper side of the leading cigar, means for cooperatively moving said members in a path to engage the leading cigar and to carry the same to a position on said supporting structure over and forward of said abutment, said moving means being sequentially operable to cause said member to serially remove the leading cigar from engagement with said abutment and to place the same forward thereof.

2. Apparatus for sequentially feeding cigars to the intake station of a continuously operable wrapping machine of the type described comprising, a supporting structure, means for receiving and continuously conveying a plurality of cigars along said supporting structure, means for providing an abutment to obstruct the continuous movement of said cigars and to cause said cigars to accumulate in a row at a forward position along said supporting structure, a first member perpendicular to said supporting structure movable from beneath to engage the underside of the leading cigar, a second member perpendicular to said supporting structure moveable from above to engage the upper side of the leading cigars, means for cooperatively moving said members in a path to engage the leading cigar and to carry the same to a position on said supporting structure over and forward of said abutment, said first member being further operable by said moving means to sequentially move said leading cigar step-wise along said structure in spaced relationship to said intake station while simultaneously separating succeeding cigars from said accumulated row.

3. Apparatus for sequentially feeding cigars to the intake station of a continuously operable wrapping machine of the type described comprising, a supporting structure, means for receiving and continuously conveying a plurality of cigars along said supporting structure, means for providing an abutment to obstruct the continuous movement of said cigars and to cause said cigars to accumulate in a row at a forward position along said supporting structure, a movable rake member having a plurality of tines perpendicular to said supporting structure said tines being adapted to engage said cigars, a movable plunger located above said supporting structure adapted to engage the upper side of said leading cigar, means for moving said rake member and said plunger in a rectilinear path to cause the rearmost tine of said rake member and said plunger to engage the underside of the leading cigar and to carry the same over said abutment to a position on said supporting structure forward of said abutment and to return the same said moving means being further operable to thereafter cause the forward tines of said member to sequentially engage said leading cigar and to move the same step-wise along said structure while simultaneously causing the rearmost tine and said plunger to serially carry the succeeding cigars over said abutment, thereby separating and moving said cigars continuously in spaced relationship toward said intake station.

4. Apparatus for sequentially feeding cigars to the intake station of a continuously operable wrapping machine of the type described comprising, a supporting structure, means for receiving and continuously conveying a plurality of cigars along said supporting structure, means for providing an abutment to obstruct the continuous movement of said cigars and to cause said cigars to accumulate in a row at a forward position along said supporting structure, a movable rake member having a plurality of tines perpendicular to said supporting structure, said tines being adapted to engage said cigars, a movable plunger located above said supporting structure adapted to engage the upper side of said leading cigar, means for cooperatively moving said rake member and said plunger in a rectilinear path to cause the rear most tine of said rake member and said plunger to engage the leading cigar and to carry the same over said abutment to a position on said supporting structure forward of said abutment and to return the same, said moving means being further operable to thereafter cause the forward tines of said member to sequentially engage said leading cigar and to move the same step-wise along said structure while simultaneously causing the rearmost tine and said plunger to serially carry succeeding cigars over said abutment, and cigar engaging means located above said supporting structure for engaging the upper side of said cigars, said cigar engaging means cooperating with the tines of said rake member to maintain the moving cigars in fixed relationship with respect to said supporting structure.

5. The apparatus according to claim 4 wherein said last named means comprise a flexible elongated member adapted to rest upon said cigars.

References Cited in the file of this patent

UNITED STATES PATENTS

| | | |
|---|---|---|
| 1,031,057 | Edwards | July 2, 1912 |
| 1,193,836 | Slick | Aug. 8, 1916 |
| 2,152,970 | Ness | Apr. 4, 1939 |
| 2,731,130 | Blickenderfer | Jan. 17, 1956 |